F. F. PATZMAN.
RESILIENT WHEEL.
APPLICATION FILED OCT. 17, 1911.

1,082,900.

Patented Dec. 30, 1913.

2 SHEETS—SHEET 1.

Witnesses
Frank R. Orr
H. C. Rodgers

Inventor
F. F. Patzman
George J. Thorpe Atty.

F. F. PATZMAN.
RESILIENT WHEEL.
APPLICATION FILED OCT. 17, 1911.
1,082,900.
Patented Dec. 30, 1913.
2 SHEETS—SHEET 2.
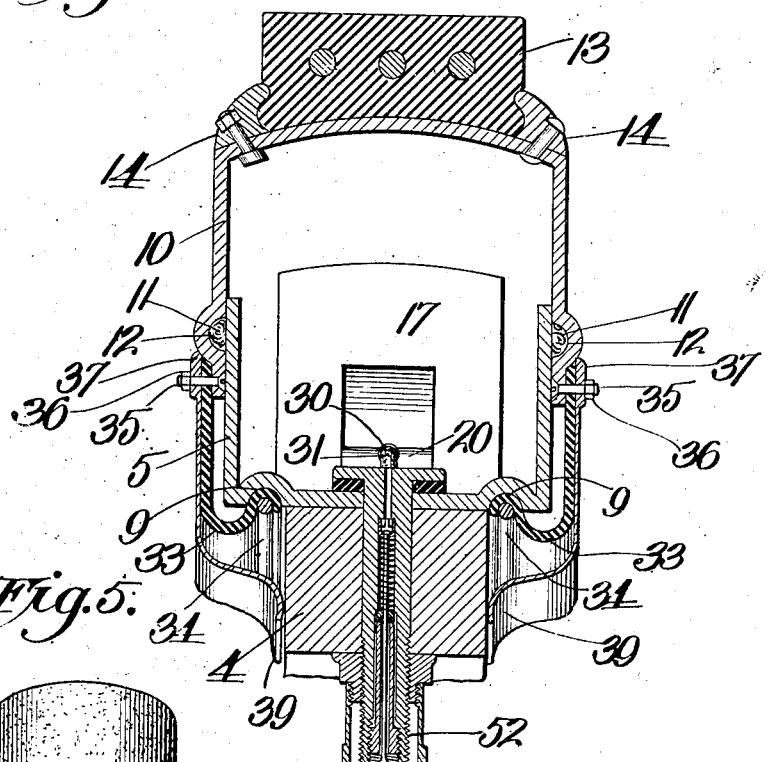
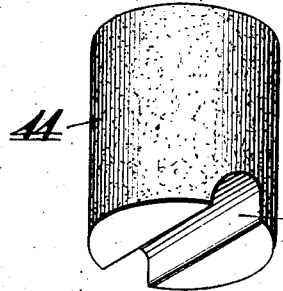
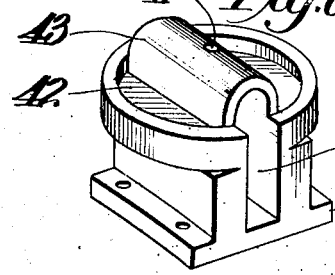
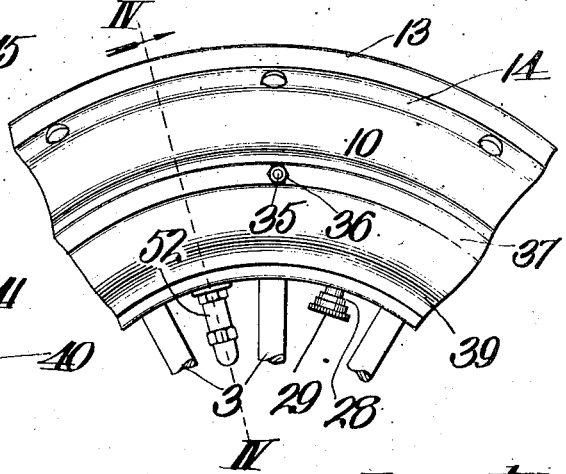
Witnesses
Frank R Glon
H. C. Rodgers
Inventor
F. F. Patzman
By George F Thorpe Atty.

UNITED STATES PATENT OFFICE.

FREDERICK F. PATZMAN, OF KANSAS CITY, MISSOURI.

RESILIENT WHEEL.

1,082,900.  Specification of Letters Patent.  Patented Dec. 30, 1913.

Application filed October 17, 1911. Serial No. 655,199.

*To all whom it may concern:*

Be it known that I, FREDERICK F. PATZMAN, a citizen of the United States, residing at Kansas City, in the county of Jackson and State of Missouri, have invented certain new and useful Improvements in Resilient Wheels, of which the following is a specification.

This invention relates to resilient wheels, and has for its object to produce a wheel of this character which will operate efficiently and reliably and embodies the desirable features of simplicity, strength, durability and inexpensiveness of construction.

To this end the invention consists in certain novel and peculiar features of construction and organization as hereinafter described and claimed; and in order that it may be fully understood reference is to be had to the accompanying drawings, in which—

Figure 1:
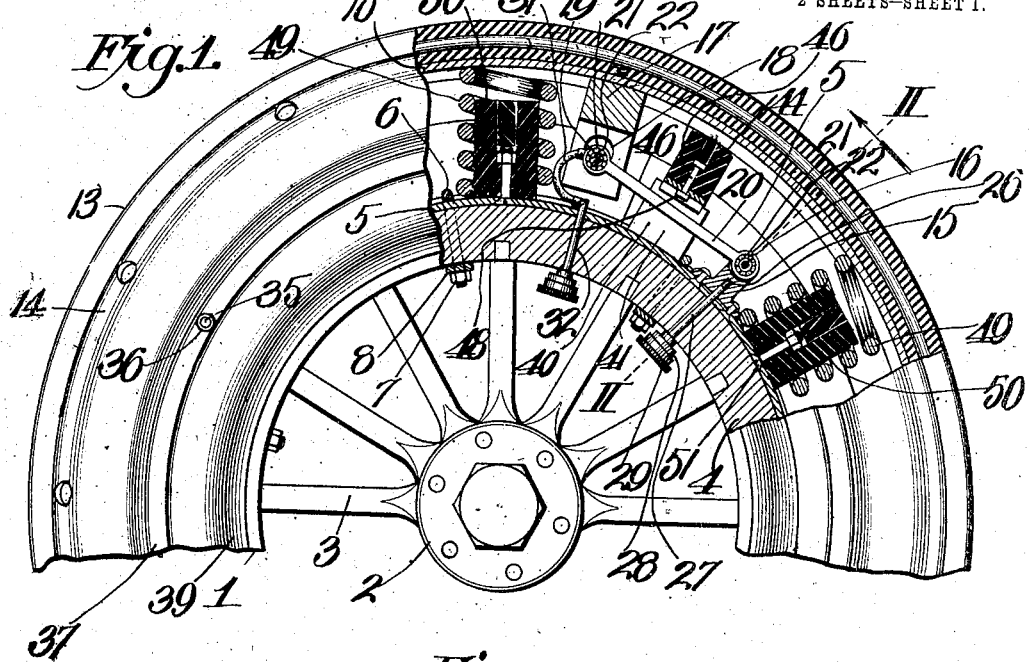
Figure 2:
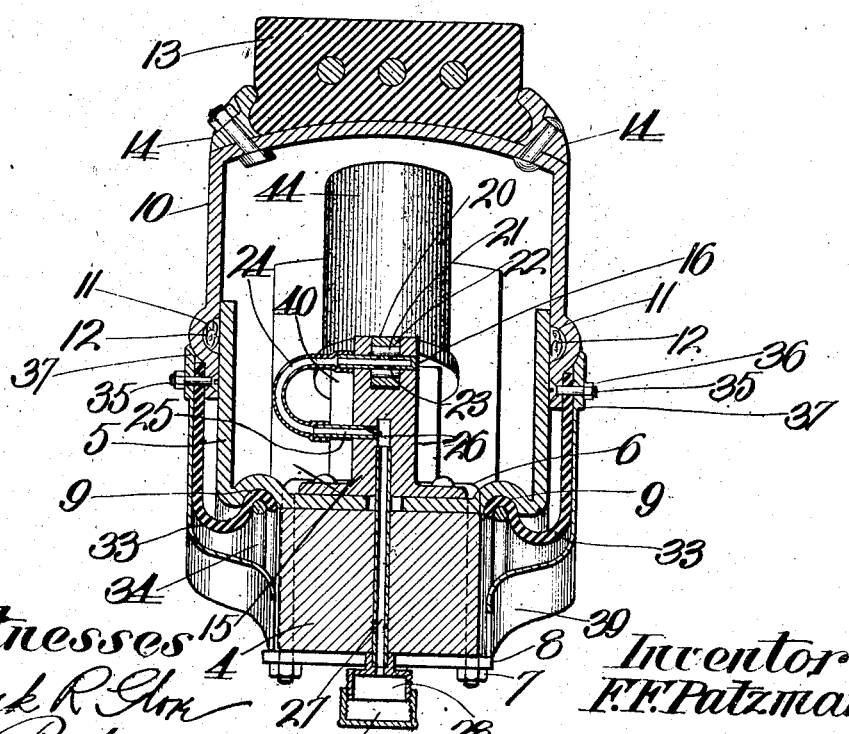

Figure 1, is a fragmentary side view of a resilient wheel embodying my invention, the wheel being partly broken away to expose features otherwise hidden. Fig. 2, is an enlarged section on the line II—II of Fig. 1. Fig. 3, is a fragmentary side view of a modified form of construction. Fig. 4 is an enlarged section on the line IV—IV of Fig. 3; Fig. 5, is a perspective view of one of the cushions or buffers; Fig. 6, is a perspective view of one of a set of brackets for supporting said cushions or buffers and for bracing certain rods against lateral or twisting movement.

In the said drawings, 1, is the inner member of a wheel and consists of a hub 2, spokes 3, felly 4, preferably of wood and a peripherally channeled metal rim 5, secured by U-bolts 6 and nuts 7, to the felly, the bolts being braced and the felly strengthened by cross plates 8, through which the ends of the bolts 6 extend. Said rim is composed of segments and is wider than the felly and is formed in its inner side, at opposite sides of the felly with annular grooves 9, for a purpose which hereinafter appears.

10 is an internally channeled rim forming part of the outer member of the wheel, and externally embraces rim 5 with a sliding relation, and is provided in its inner sides with annular grooves 11 containing packings 12, engaging the outer sides of rim 5 to establish dust-proof and lubricating joints therewith. Secured peripherally to the rim 5 and forming a part of the outer member of the wheel, is a compressible tread 13, of rubber or equivalent material, rings 14 secured to said rim, holding said tread in place. One of said rings is bolted in position so that it may be readily removed preliminary to securing the tread in or removing it from position.

To prevent material independent rotative action between the inner member and the outer member of the wheel, I provide the following construction: At suitable points a number of brackets 15 are secured to and within the rim 5 of the wheel, only one of such brackets being illustrated, and said brackets project radially outward and are bifurcated in their outer ends and secured in said bifurcated ends are transversely arranged pins 16. 17 is a corresponding number of brackets within and secured in any suitable manner to the peripheral portion of rim 10, and projecting radially inward thereof. Said brackets are bifurcated at their inner ends and at opposite sides of the bifurcations are provided with openings 18, and extending through and adapted for play in said openings are transversely arranged pins 19. 20 are links arranged within the rims and provided at their ends with circular openings 21 materially larger than and receiving said pins 16 and 19 of adjacent brackets 15 and 17, and to constitute antifriction pivoted connections between the pins and links, circular series of rollers 22 are arranged within said openings 21 around said pins.

For the purpose of lubricating the pivoted connections of links 20 with pins 16, the latter are hollow and provided with perforations 23 through which oil may pass and one end of each pin 16 is open and projects to one side of its respective bracket 15 and said pins are connected by curved tubes 24 to tubes 25 carried by the adjacent brackets 15 to radial passages 26 in the said brackets. Communicating with said passages are radial tubes 27 extending through the felly and the bridge portion of rim 5, and leading from oil reservoirs 28, closed with liquid tight joints by screw caps 29. To lubricate the pivoted connections of links 20 with pins 19, the ends of said links encircling said pins 19, are provided with openings 30 with which communicate the outer ends of flexible tubes 31 connected at their inner ends to oil tubes 32 corresponding to tubes 27, and provided inward of the felly, with oil reservoirs corresponding to those connected to tubes 27.

To constitute air and dust proof connections between the rims 5 and 10, rings 33 of leather or other flexible material, are secured at their inner margins in grooves 9 by means of clamping rings 34, as shown, or in any other suitable manner, and at their outer margins said rings 33 fit upon bolts 35 projecting outward from the sides of rim 10, and said outer margins of the flexible rings are clamped tightly against rim 10, by nuts 36, engaging the bolts.

To protect the flexible rings from abrasion or other injury and to form washers between the flexible rings 33 and nuts 36, metal shields 37 are provided, the same extending inward beyond the innermost portions of the flexible rings and terminating in portions 39 converging inward toward the sides of the felly. By this arrangement it will be seen that when the wheel is running in a rut in the roadway or comes in contact with a street curb, there will be no danger of the flexible rings being abraded or cut, and that the inwardly-extending portions of the shields 39 will tend to deflect outward any mud in which the wheel may become embedded to a depth greater than the distance between the felly and the peripheral portion of the tread.

For holding the inner and outer members centralized with respect to each other, under normal conditions, brackets 40 are disposed within the inner rim 5 and secured in any suitable manner to the bridge portion thereof, and are provided with slots 41 through which links 20 extend, the slots being narrow so as to guard against lateral movement of the links without interfering with their free movement in the plane of the circumference of the wheel. The brackets are provided near their outer ends with sockets 42, and ribs 43 extending diametrically of said sockets, which ribs form arched outer ends for the slots 41.

44 are resilient cushions or buffers of rubber by preference, which fit at their inner ends in sockets 42 and are provided at such ends with diametric grooves 45 receiving the arched ribs 43, and to secure said cushions reliably to said brackets, bolts 46 are embedded in the cushions and extend through holes 47 in the ribs and are engaged at their inner ends by nuts 48.

The cushions 44 terminate short of the peripheral portion of rim 10, and contact with the latter only in the event that the wheel runs over an unusual projection or depression of the roadway. In such case the particular cushions 44 approximately underlying the axis of movement, will move downward and yieldingly limit the downward movement of the inner member by contact with the outer member. The upwardly projecting cushions will check the rebound of the inner member and cushion the same by contact with the upper part of the outer member or rim.

In the preferred type of construction, radially arranged springs 49 are fitted, under compression, in the said rims, and bear at their opposite ends against the inner rim and the outer rim, and are held in place by resilient cushions 50, which are encircled by said springs and bolted at 51, as shown or otherwise, to one of the rims, preferably to the inner rim as shown in Fig. 1.

If desired the springs 49 and cushions 50 may be dispensed with and the rim held centralized in resilient relation by compressed air, the air being introduced through the medium of a valve mechanism 52, of the type shown or of any other suitable or preferred type. As no claim is made to the special type of valve mechanism the same is not described in detail.

Assuming that the rims are held apart by compressed air introduced through the valve mechanism, or by springs 49, it is obvious that when the machine of which the wheel forms a part, is loaded the inner member of the wheel will settle until its axis is slightly below that of the outer member, and that during the progress of the machine, the inner member will move upward and downward more or less, according to the irregularities in the roadway over which the wheel passes, as customary in this class of wheels. In the event that compressed air is employed to hold the members in proper relation, air will pass packings 12 and be confined between the flexible rings and the rims. Such air will distend the flexible rings, which in this case must be elastic, as otherwise the air confined within the rims and rings 33, will have no power to hold the rims in concentric relation and cushion their vibratory movements.

In the construction shown by Fig. 1, in which springs 49 are employed to yieldingly hold the inner and outer members of the wheel in concentric relation, the cushions 50 perform two functions, they hold the springs in their proper positions and co-operate with cushions 40 in cushioning the members when under unusually severe jolting, there occurs sufficient vertical play to effect contact between the outer member and the cushions 44 as hereinbefore explained. In both cases, the members are compelled to rotate together through the link connections between brackets 15 and 17, provision being made through the pin and slot connection constituted by pins 31 and openings 18, for the accommodation of independent vibratory movement of the members in any direction.

From the above description, it will be apparent that I have produced a resilient wheel embodying the features of advantage enumerated as desirable, and I wish it to be understood that while I have illustrated and described the preferred embodiment of the same, I do not desire to be restricted to the exact details of construction shown and described, as obvious modifications will suggest themselves to one skilled in the art.

I claim:

1. A resilient wheel, comprising an inner member provided with a peripherally channeled circular rim, an outer member consisting of a compressible tread and an internally channeled circular rim, flexible rings at opposite sides of the peripherally channeled rim and secured at their inner margins thereto, and at their outer margins to the internally channeled rim, springs interposed between and bearing against said rims, a series of brackets secured to the inner rim and a like number of brackets secured to the outer rim, and links connecting the brackets of one of said rims with the brackets of the other rim and extending at approximately right angles to the radii of the wheel drawn therethrough; each link being loosely pivoted at one end and restricted at its other end to pivotal movement in a plane parallel with the face or side of the wheel.

2. A resilient wheel, comprising an inner member provided with a peripherally channeled circular rim, an outer member consisting of a compressible tread and an internally channeled circular rim, the last-named rim fitting around and snugly embracing the first-named rim with a sliding relation, flexible rings at opposite sides of the peripherally channeled rim and secured at their outer margins to the inner side of the internally channeled rim and at their inner margins to the peripherally channeled rim, a series of springs arranged within and bearing at their opposite ends against said rims and tending to hold the same in concentric relation, brackets secured to the inner rim within the channel thereof, a similar number of brackets secured to and within the channel of the outer rim and links connected to the brackets of the inner rim and restricted to pivotal movement thereon, said links also having a pin and slot connection with the brackets of the outer rim.

3. In a resilient wheel, an inner member, an outer member surrounding the inner member, springs interposed between and bearing against said members and tending to hold them in concentric relation, brackets secured to the inner member, brackets secured to the outer member, links pivotally connecting the first-named and last-named brackets in pairs, oil reservoirs secured to the inner member of the wheel, pipes extending outwardly from said reservoirs, and flexible tubes leading from the said pipes to the pivotal points of said links.

4. A resilient wheel comprising telescoping inner and outer rims, said outer rim having a resilient tread surface, flexible ring coverings for sealing the joints between said rims, a series of slotted blocks secured to the inner rim within the space between said inner and outer rims, each of said blocks carrying a resilient plug slightly spaced normally from the outer rim, and a series of link connections extending through the slots of said blocks and having lateral play therein, each of said links being pivoted to the inner rim and having a loose-play connection with the outer rim.

In testimony whereof I affix my signature, in the presence of two witnesses.

FREDERICK F. PATZMAN.

Witnesses:
HELEN C. RODGERS,
G. Y. THORPE.

Copies of this patent may be obtained for five cents each, by addressing the "Commissioner of Patents, Washington, D. C."